(12) United States Patent
Khailany et al.

(10) Patent No.: US 8,024,553 B2
(45) Date of Patent: Sep. 20, 2011

(54) DATA EXCHANGE AND COMMUNICATION BETWEEN EXECUTION UNITS IN A PARALLEL PROCESSOR

(75) Inventors: Brucek Khailany, San Francisco, CA (US); William James Dally, Stanford, CA (US); Ujval J. Kapasi, San Jose, CA (US); Jim Jian Lin, Saratoga, CA (US)

(73) Assignee: Calos Fund Limited Liability Company, Dover, DE (US)

( * ) Notice: Subject to any disclaimer, the term of this patent is extended or adjusted under 35 U.S.C. 154(b) by 241 days.

(21) Appl. No.: 12/192,813

(22) Filed: Aug. 15, 2008

(65) Prior Publication Data

US 2008/0307207 A1    Dec. 11, 2008

Related U.S. Application Data

(62) Division of application No. 11/973,887, filed on Oct. 9, 2007.

(60) Provisional application No. 60/849,945, filed on Oct. 6, 2006.

(51) Int. Cl.
*G06F 9/44* (2006.01)
*G06F 15/76* (2006.01)

(52) U.S. Cl. .................................... 712/225; 712/33
(58) Field of Classification Search .............. 712/225, 712/33

See application file for complete search history.

(56) References Cited

U.S. PATENT DOCUMENTS

| 5,301,281 | A  | * | 4/1994 | Kennedy .................. 710/307 |
| 7,046,687 | B1 | * | 5/2006 | Brown et al. .............. 370/412 |
| 7,650,453 | B2 | * | 1/2010 | Torii ........................ 710/240 |
| 2002/0161978 | A1 | * | 10/2002 | Apostol et al. ............ 711/151 |
| 2004/0100954 | A1 | * | 5/2004 | Dai et al. .................. 370/389 |

* cited by examiner

*Primary Examiner* — Daniel Pan

(57) ABSTRACT

A method of operation within an integrated-circuit processing device having a plurality of execution lanes. Upon receiving an instruction to exchange data between the execution lanes, respective requests from the execution lanes are examined to determine a set of the execution lanes that may send data to one or more others of the execution lanes during a first interval. Each execution lane within the set of the execution lanes is signaled to indicate that the execution lane may send data to the one or others of the execution lanes.

14 Claims, 12 Drawing Sheets

4-way Multiply and add (same output precision):

4-element Dot-product and Add:

2-element Dot-product and Add:

2-way Multiply with double-precision output and add:

4-way Multiply with double-precision output and add:

2-way Multiply and add (same output precision):

2-way 4-element Sum and Add (8b A, 8b B, 16b C):

4-element Sum and Add:

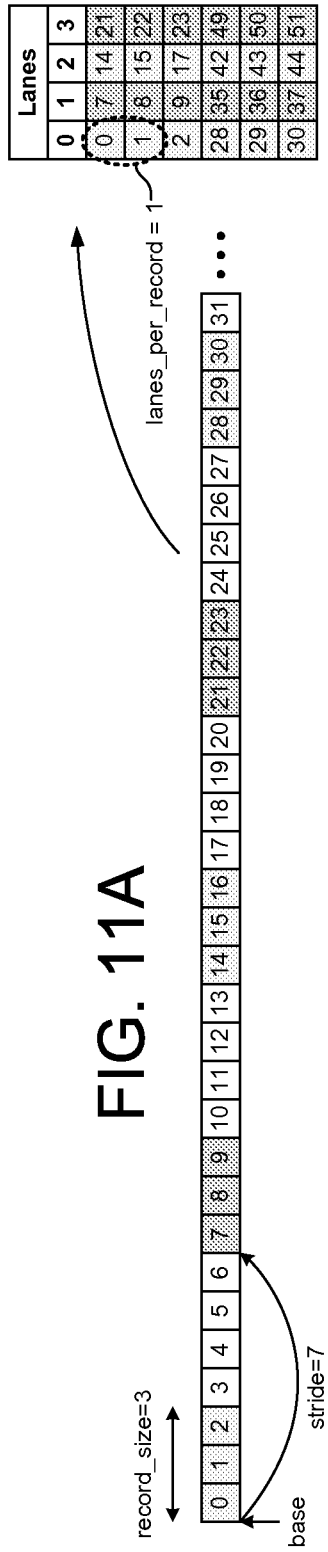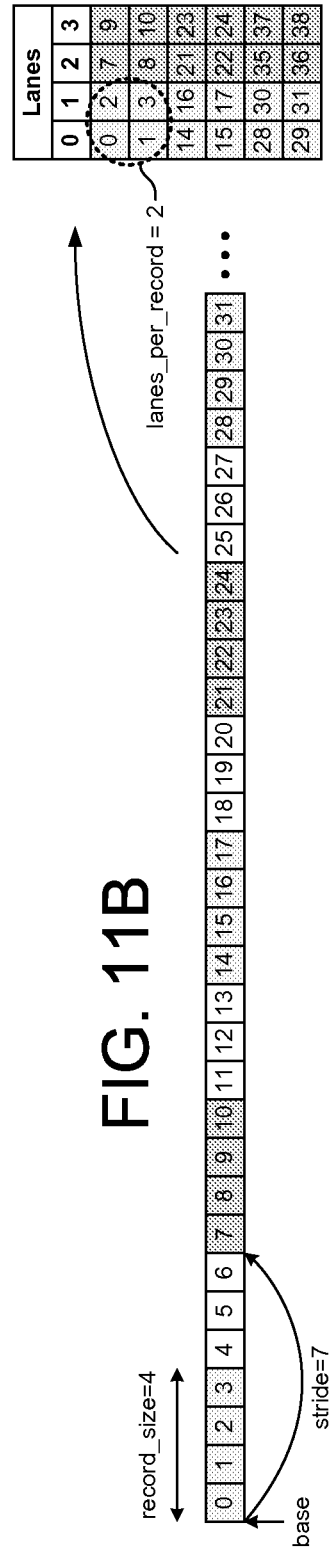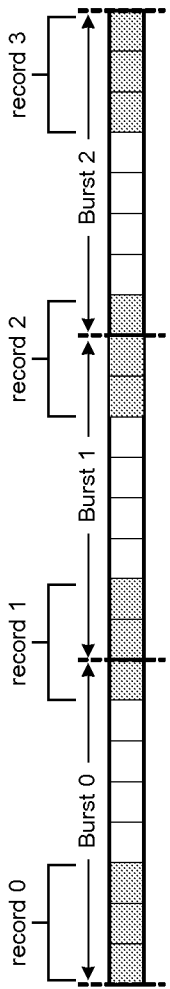
FIG. 11A
FIG. 11B
FIG. 12

US 8,024,553 B2

DATA EXCHANGE AND COMMUNICATION BETWEEN EXECUTION UNITS IN A PARALLEL PROCESSOR

CROSS-REFERENCE TO RELATED APPLICATIONS

This application is a division of U.S. patent application Ser. No. 11/973,887 filed Oct. 9, 2007 and entitled "Data-Parallel Processing Unit," which claims priority from U.S. Provisional Application No. 60/849,945 filed Oct. 6, 2006. Application Ser. Nos. 11/973,887 and 60/849,945 are hereby incorporated by reference.

TECHNICAL FIELD

The present invention relates to design and operation of parallel processing systems and components thereof.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 11A and 11B illustrate retrieval of data and distribution of the retrieved data to lanes;

FIG. 12 illustrates memory burst sequences and the manner in which selected words within each burst sequence may be associated with execution lanes in accordance with one embodiment;

DETAILED DESCRIPTION

System Context

Figure 1:
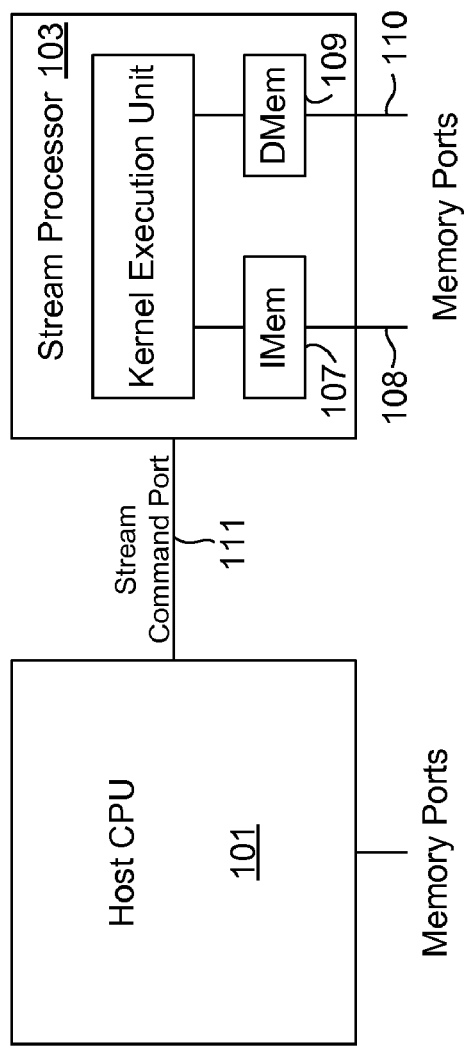
FIG. 1 illustrates an exemplary system including a host CPU and a data-parallel co-processor.

Embodiments of data-parallel/instruction-parallel processors disclosed herein may be employed as co-processors that execute compound vector operations as computation kernels compiled from a programming language. As shown in FIG. 1, a host CPU executes the main application code in a data processing system. The host CPU sends commands to a data-parallel and/or instruction-parallel processor, referred to herein as a stream processor. The commands issued by the host CPU to the stream processor, referred to herein as stream commands, instruct the stream processor when to load and store instructions and data from an external memory into the stream processor's local memory and when to execute computation kernels to process this data.

Figure 2:
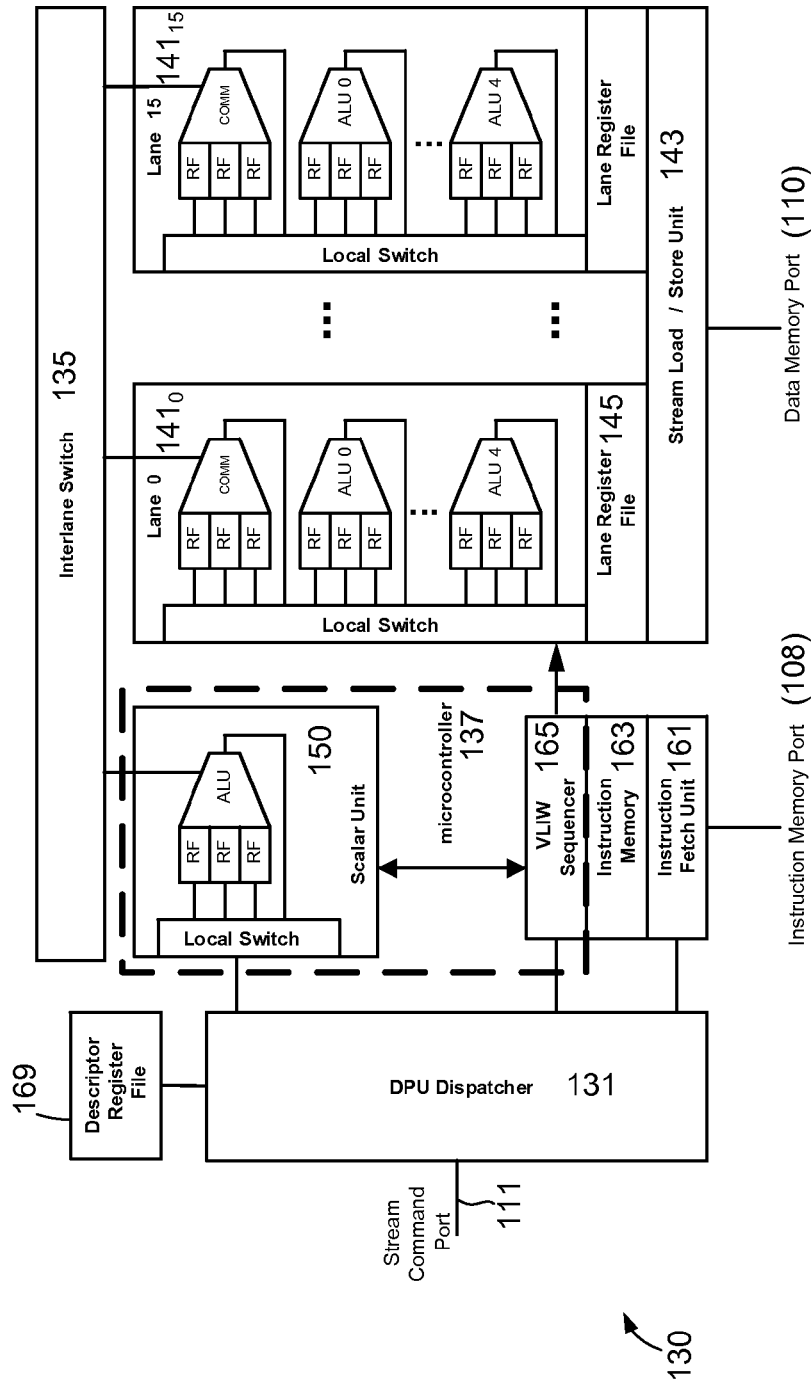
FIG. 2 shows an embodiment of a stream processor that may be used to implement the data-parallel co-processor of FIG. 1.

FIG. 2 shows one embodiment of a stream processor 130 with 16 lanes, each having 5 arithmetic-logic units (ALU0-ALU4), and 1 communication (COMM) unit per lane. A DPU (Data-Parallel Unit) Dispatcher 131 receives the stream commands from a host processor via port 111. The DPU Dispatcher 131 buffers the commands locally until they are ready to be issued to various execution units. Descriptor registers are stored in the descriptor register file 169 and accessed by the DPU dispatcher when commands are issued to the execution units. There are three main units for executing stream commands: an instruction fetch unit 161, a stream load/store unit 143, and a kernel execute unit, the kernel execute unit itself including, in this example, a very-long-instruction word (VLIW) sequencer 165, scalar unit 150, sixteen execution lanes $141_0$-$141_{15}$, and interlane switch 135.

The instruction fetch unit 161 transfers code between an external memory and a local instruction memory 163 via instruction memory port 108. The stream load/store unit 143 transfers data between external memory and the lane register files 145 (LRFs) via data memory port 110. During kernel-execute stream commands, the VLIW sequencer 165 fetches VLIW instructions from the instruction memory 163 and sends decoded instructions to the lanes $141_0$-$141_{15}$ and the scalar unit 150. The VLIW sequencer 165 also controls instruction sequencing with branch instructions. The lanes $141_0$-$141_{15}$ (also referred to as execution lanes) include a lane register file (LRF) for data memory, some number of function units (ALU0-ALU4 in this example) for executing arithmetic and data movement instructions, and a number of dedicated operand register files (RF) per function unit. A COMM unit accesses the inter-lane switch to provide a mechanism to exchange data among the lanes 141 and between the scalar unit 150 and the lanes 141.

The lanes 141 receive VLIW instructions from the VLIW sequencer 165 and execute the same instruction each clock cycle on each lane in a single-instruction, multiple-data (SIMD) fashion. Within each lane, the VLIW instruction controls the configuration of the local switch 149, the reading and writing of the operand register files (RF), the reading and writing of the lane register file 145, and the operations being performed on each of the function units (ALUs).

In order to support high-frequency execution, a multi-stage hardware pipeline can be used. A long pipeline enables the long latency of executing one VLIW instruction on a highly parallel machine to be split up. The steps required for execution of one instruction involve sending the instruction address from the VLIW sequencer 165, reading a VLIW instruction from the instruction memory 163, decoding the instruction, distributing it across a long distance to all of the lanes $141_0$-$141_{15}$, reading from the operand register files (RF), executing function unit operations specified by the VLIW instruction, traversing the local switch 149 for writing back results, and finally writing results back into the operand register file (RF). In a highly-parallel high-frequency processor, this process often requires tens of cycles to fully execute a VLIW instruction.

Figure 3:
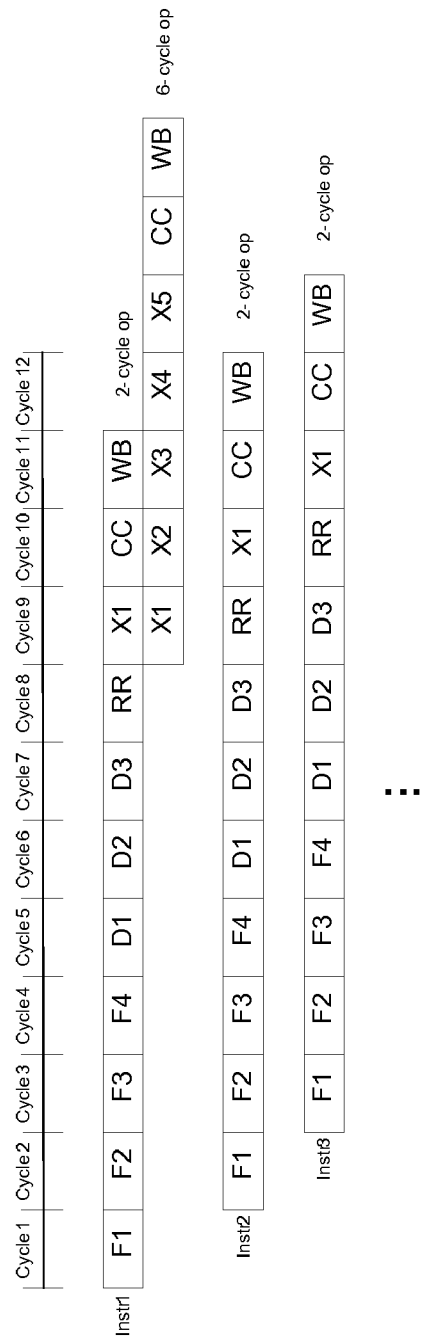
FIG. 3 illustrates an embodiment of pipelined instruction execution within the stream processor of FIG. 2.

In the stream processor of FIG. 2, individual instruction execution may be pipelined in order to achieve high-frequency operation. One embodiment of this pipelining is shown in FIG. 3. The instruction fetch and decode stages, denoted by F1-F4 and D1-D3 respectively, split the reading of the instruction memory and instruction decode across seven total cycles. Within each lane, the register read (RR) and individual operations in the ALU (X1, X1:X5 depending on operation latency) can be pipelined. Finally, a cross-cluster (i.e., intra-lane) and write-back stage can be used for traversing the local switch and writing back to the operand register files (RFs). Other embodiments can use more or fewer pipeline stages in order to trade off power dissipation for clock frequency.

Kernel Execution

Herein, "kernel" refers to a relatively small program that generally uses data in the lane register files 145 as input data, writes output data back to the lane register file 145 and also accepts scalar arguments from the host processor through the DPU dispatcher 131. Kernels are generally restricted from accessing external memory locations. Also, in one embodiment, only addresses in the lane register file 145 associated with each lane 141 are addressable during kernel computation. Communication between lane register files is explicitly handled in the kernel program by using the COMM unit. Since there is a single shared VLIW sequencer 165, control flow decisions such as branches for supporting loops apply to all lanes 141.

The stream processor of FIG. 2 generally achieves highest performance efficiency when executing compound vector operations in kernel inner loops. Compound vector operations perform a sequence of arithmetic operations on data read from the lane register file 145, and generate results written back to the lane register file 145. During compound vector operations, data is read and written from the lane register file 145 sequentially at very high bandwidth.

Kernel execution in a stream processor is not limited to the compound vector operation model. Random or indexed access to streams in the lane register file 145 may be provided, for example, using register-plus-offset indexed addressing. With indexed streams, data in the lane register file is not treated as sequential streams and is not pre-fetched or buffered separately, but more like a traditional VLIW architecture with a load/store unit, access to the lane register file data memory is done directly using explicit addresses. In this mode of operation the architecture has a disadvantage of longer-latency and lower-bandwidth access but the advantage of providing random access to the lane register file during kernels.

COMM Unit—PERMCOMP

The communication unit (COMM) within each lane 141 provides a simple interface to the inter-lane switch 135, used to exchange data between the lanes. The COMM unit can support arbitrary permutations on 8-bit, 16-bit, or 32-bit data. In normal modes, permutation patterns are specified when each destination lane specifies dynamically from one of its operands which lane to get its source data from. In this way, static permutations can be easily supported. Dynamic inter-lane communication patterns can also be supported if the source is dynamically computed on the destination lane 141.

In some applications, it may be desirable for the source lane, rather than the destination lane, to compute the destination dynamically. In contrast to prior-art data-parallel processing devices, the stream processor of FIG. 2 supports this type of source-lane destination computation. In one embodiment, a special instruction, permutation compute (PERMCOMP), is implemented to manage this type of communication. When the PERMCOMP instruction is encountered by the VLIW sequencer, a microcontroller formed by the VLIW sequencer 165 and scalar unit 150 takes in a request to send data from each of the 16 lanes $141_0$-$141_{15}$. Each request is comprised of a destination lane and a valid bit. Once the requests are collected by the microcontroller from all the lanes, they are arbitrated. The originating lane (or source lane) is sent a single bit (success/no success) to inform the lane whether or not it can successfully send data. Each destination lane to which valid data is directed is sent the source lane number and a valid signal. An unsuccessful send (i.e., bit indicating no-success to source lane) signals the source lane that a collision has occurred (i.e., conflict within the interlane switch). This approach has several advantages:

1) Supports efficient data communication among lanes even when communication pattern is non deterministic.
2) Fast communication with lower overhead than a pure software approach.
3) Centralized arbitration yields minimal hardware requirement for this instruction (PERMCOMP).
4) Deterministic instruction latency allows for efficient scheduling in the compiler; pipelined so that it does not become a cycle time limiter.

Figure 5:
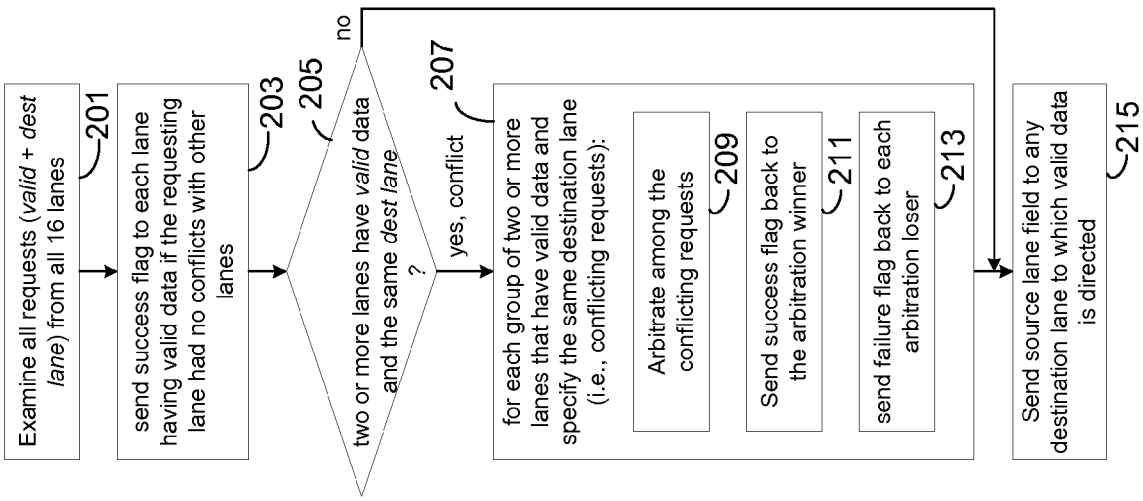
FIG. 5 illustrates operations of the microcontroller during execution of the permutation-compute instruction.
Figure 4:
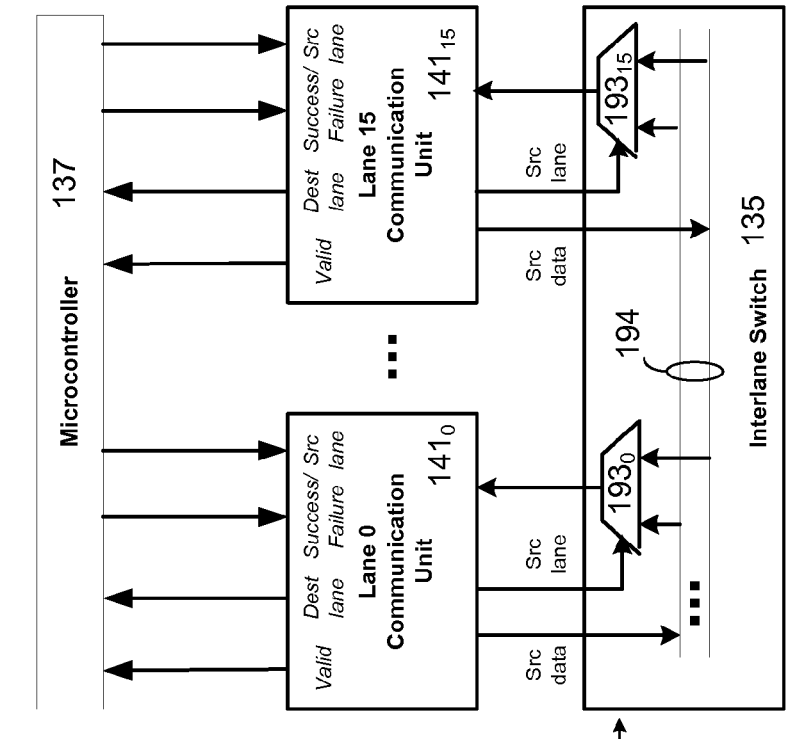
FIG. 4 illustrates signaling between a microcontroller, execution lanes and an interlane switch to effect inter-lane data transfer during execution of a permutation-compute (PERMCOMP) instruction.
Figure 6C:
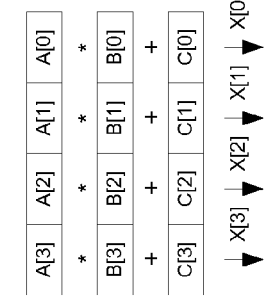
FIGS. 6A-6H illustrate respective combined arithmetic operations that correspond to pseudo-code listings herein.
Figure 6B:
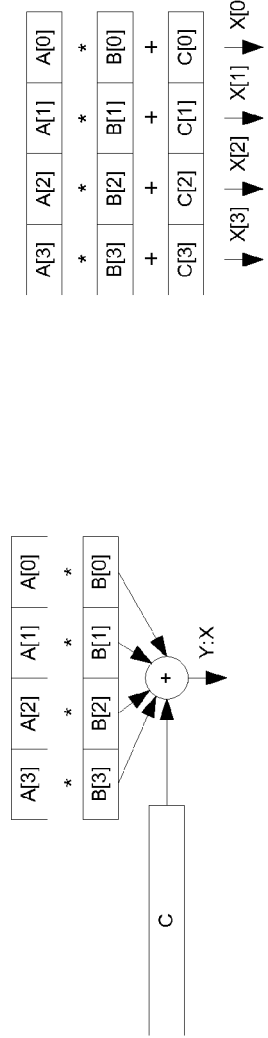
Figure 6A:
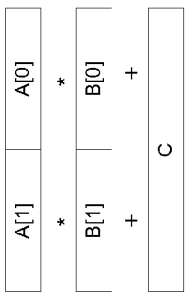
Figure 6F:
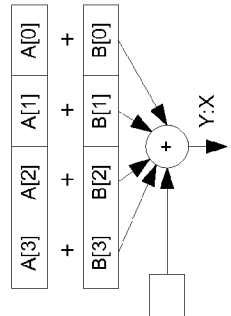
Figure 6E:
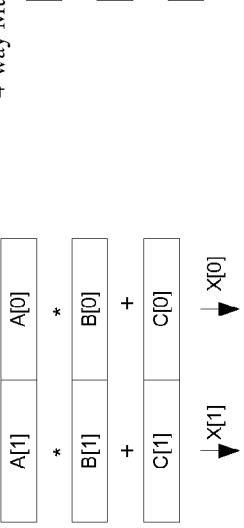
Figure 6D:
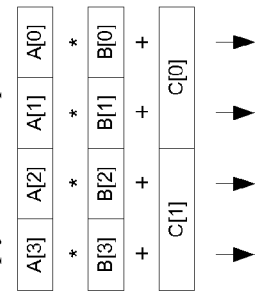
Figure 6H:
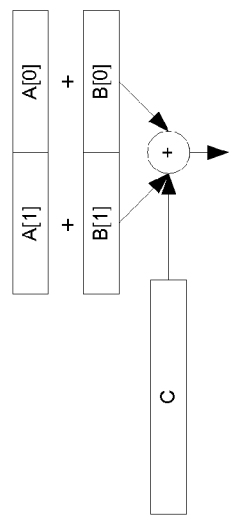
Figure 6G:
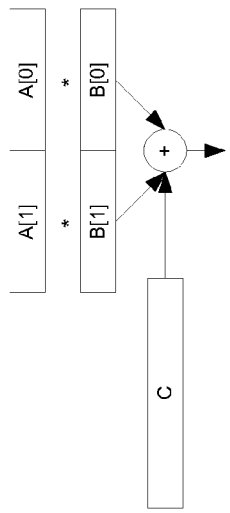

FIG. 4 illustrates the above-described signaling between the microcontroller, execution lanes and interlane switch during execution of a PERMCOMP instruction. As discussed, at the start of PERMCOMP execution, the microcontroller receives a destination lane identifier (Dest Lane) and corresponding valid signal (Valid) from each lane, the valid signal indicating whether the lane is requesting to transfer data via the interlane switch (i.e., whether the lane is a source lane) and the destination lane identifier specifies the lane to which data is directed. Referring to FIG. 5, which illustrates operations of the microcontroller during PERMCOMP execution, the microcontroller examines the request from all lanes (201), and then, as shown at 203, sends the success/failure flag (Success/Failure) to each lane having valid data (i.e., asserting the valid signal) if the destination lane requested by the source lane was not requested by any other lane (i.e., no conflicts with other lanes). If two or more lanes having valid data specify the same destination lane (decision block 205), then a conflict arises and the microcontroller responds as shown at 207 by arbitrating between the conflicting requests (209), sending a success flag (or signal) to the arbitration winner (211) and sending a failure flag to each arbitration loser (213).

In the embodiment of FIG. 4, each of execution lanes $141_0$-$141_{15}$ controls the source of any transfer via the interlane switch 135, for example, by providing a source-lane value (Src lane) to a respective one of multiplexers $193_0$-$193_{15}$. Accordingly, as shown at block 215 in FIG. 5, after success/failure flags have been sent to each requesting lane (i.e., as in block 203 for non-conflicting requests, and as in blocks 205/207 for conflicting requests), the microcontroller identifies the destination lanes for all successful requests (i.e., requests for which success flags are asserted) and sends source lane information to each destination lane to enable the destination lane to control the source lane selection in the corresponding multiplexer 193.

Note that in the embodiment shown, each of multiplexers 193 includes a respective input port coupled to each of sixteen communication lanes (194) within the interlane switch, thus enabling each lane to receive data from any others of the lanes and also permitting a given source lane to transmit data to multiple destination lanes. In alternative embodiments, other switching structures may be used (e.g., programmable crossbar), including structures that permit less than all possible source lanes to transfer to a give destination lane and/or that limit the number of destination lanes to which a source lane may send data.

With regard to arbitration between conflicting requests (e.g., as shown in FIG. 5 at 209), any desirable arbitration policy may be applied to identify the arbitration winner. For example, in one embodiment, the microcontroller may arbitrate between conflicting requests based on a fixed priority assigned to individual lanes (e.g., always selecting a lower-numbered lane over a higher-numbered lane, or vice-versa). In other embodiments, a least-recently-selected policy or other starvation-avoidance policy may be applied to ensure that no individual lane fails to receive at least some share of the interlane transfer bandwidth (i.e., no requesting lane is repeatedly denied access to the interlane switch ("starving") due to sustained higher-priority requests). Moreover, in yet other embodiments, the stream processor may support multiple arbitration policies, with one of the multiple different arbitration policies selected through run-time configuration register setting (or one-time or otherwise non-volatile programming operation during device production) or selected by a bit or bits within or associated with the PERMCOMP instruction.

Function Unit (ALU) Operations—Instruction Set Architecture

Each of the ALUs shown within the execution lanes 141 (and/or scalar unit) of FIG. 2 supports a number of 3-input-operand (or less) and 2-output-operand (or less) operations for doing arithmetic and logical functions. Signal, image, and video processing applications may use the following data-types packed into a 32-bit word:

Packed unsigned integer 8$b$
Packed unsigned integer 16$b$
Unsigned integer 32$b$
Packed signed integer 8$b$
Packed signed integer 16$b$
Signed integer 32$b$
Packed signed integer complex 16$b$ pairs
Packed unsigned fixed-point 8$b$
Packed unsigned fixed-point 16$b$
Unsigned fixed-point 32$b$
Packed signed fixed-point 8$b$
Packed signed fixed-point 16$b$
Signed fixed-point 32$b$
Packed signed fixed-point complex 16$b$ pairs Some example operations supported by an ALU to process this packed data are shown below:

Absolute difference
Addition and subtraction with saturation
Format conversion (packing/unpacking) between data-types, including clipping/saturation
Division (or divide step) and remainder
Dot Product
Minimum/maximum
Logic ops: negate, xor, or, and
Fractional multiplies with rounding and saturation
Sums between different sub-words
Integer multiplies with saturation
Comparison operations (less than, greater than, equal to, etc . . . )
Arithmetic and Logical Shifts
Conditionals: Ternary select
Fixed-point: Find first one, normalize There are particular advantages to supporting a three-operand instruction as a basic operation in DSP applications. Since many image, video, and signal processing computation kernels exhibit large amounts of instruction-level parallelism (ILP) and data-level parallelism (DLP) (which can be converted into ILP via software pipelining or loop unrolling), kernel performance is often limited by the available instruction throughput (instructions per cycle) and not by the latency through the critical path of a computation kernel. In these types of applications, if two common arithmetic functions are grouped together into a single operation at a small or negligible area cost (and/or frequency penalty), this tradeoff can result in higher overall performance.

In contrast to the more limited support for combined arithmetic functions in typical prior-art DSPs (i.e., multiply-accumulate as described above), each of the ALUs within the stream processor of FIG. 2 may include a microarchitecture that enables a substantially broader combination of arithmetic functions, including combinations of operations that use the multiplier array where the partial result is added to an accumulator before the final result is computed are supported. More specifically, such combination operations may include, in addition to multiply-accumulate (i.e., multiplications in which the multiplication result is added to an accumulator):

Dot-products (both real and complex) where the result is added to an accumulator Multiple simultaneous dot products on packed data with shifted data alignment in one operation Full and partial sums between sub-words where the result is added to an accumulator Pseudo-code expressions for specific examples of these combined-function operations are provided below (with corresponding graphical representation as shown by example in FIGS. 6A-6H), wherein the symbol '*' indicates multiplication, 'X' and 'Y' are outputs from a given ALU (e.g., X=accumulated sum, Y=carry value), and 'A', 'B' and 'C' are operands supplied to the ALU (e.g., A and B may be multiplicands, and C an accumulated value to which the A*B product is to be added):

2-element Dot-product and Add (FIG. 6A):

$$Y:X=\text{sign\_ext}(A[1]*B[1]+A[0]*B[0])+C$$

2-element Dot-product with Negate and Add:

$$Y:X=\text{sign\_ext}(A[1]*B[1]-A[0]*B[0])+C$$

4-element Dot-product and Add (FIG. 6B):

$$X=A[3]*B[3]+A[2]*B[2]+A[1]*B[1]+A[0]*B[0]+C$$

4-way Multiply and add (same output precision) (FIG. 6C):

$$X[3]=A[3]*B[3]+C[3]$$

$$X[2]=A[2]*B[2]+C[2]$$

$$X[1]=A[1]*B[1]+C[1]$$

$$X[0]=A[0]*B[0]+C[0]$$

2-way Multiply and add (same output precision) (FIG. 6D):

$$X[1]=A[1]*B[1]+C[1]$$

$$X[0]=A[0]*B[0]+C[0]$$

4-way Multiply with double-precision output and add (FIG. 6E):

$$Y[1]=A[3]*B[3]+C[0]$$

$$Y[0]=A[2]*B[2]+C[0]$$

$X[1]=A[1]*B[1]+C[1]$ $X[0]=A[0]*B[0]+C[1]$ 2-way Multiply with double-precision output and add (FIG. 6F):

$Y=A[1]*B[1]+C$ $X=A[0]*B[0]+C$ 4-element Sum and Add (FIG. 6G):

$X=A[1]+A[0]+B[1]+B[0]+C$ 2-way 4-element Sum and Add (8b A, 8b B, 16b C) (FIG. 6H):

$X[1]=A[3]+A[2]+B[3]+B[2]+C[1]$ $X[0]=A[1]+A[0]+B[1]+B[0]+C[0]$

In all operations, by supplying a zero to the C input operand, each operation can be simplified to a multiply, dot-product, or sum. Furthermore, depending on input and output data-types, these basic operations can be augmented to support saturation and clipping or rounding.

ALU Micro-Architecture

Figure 7:
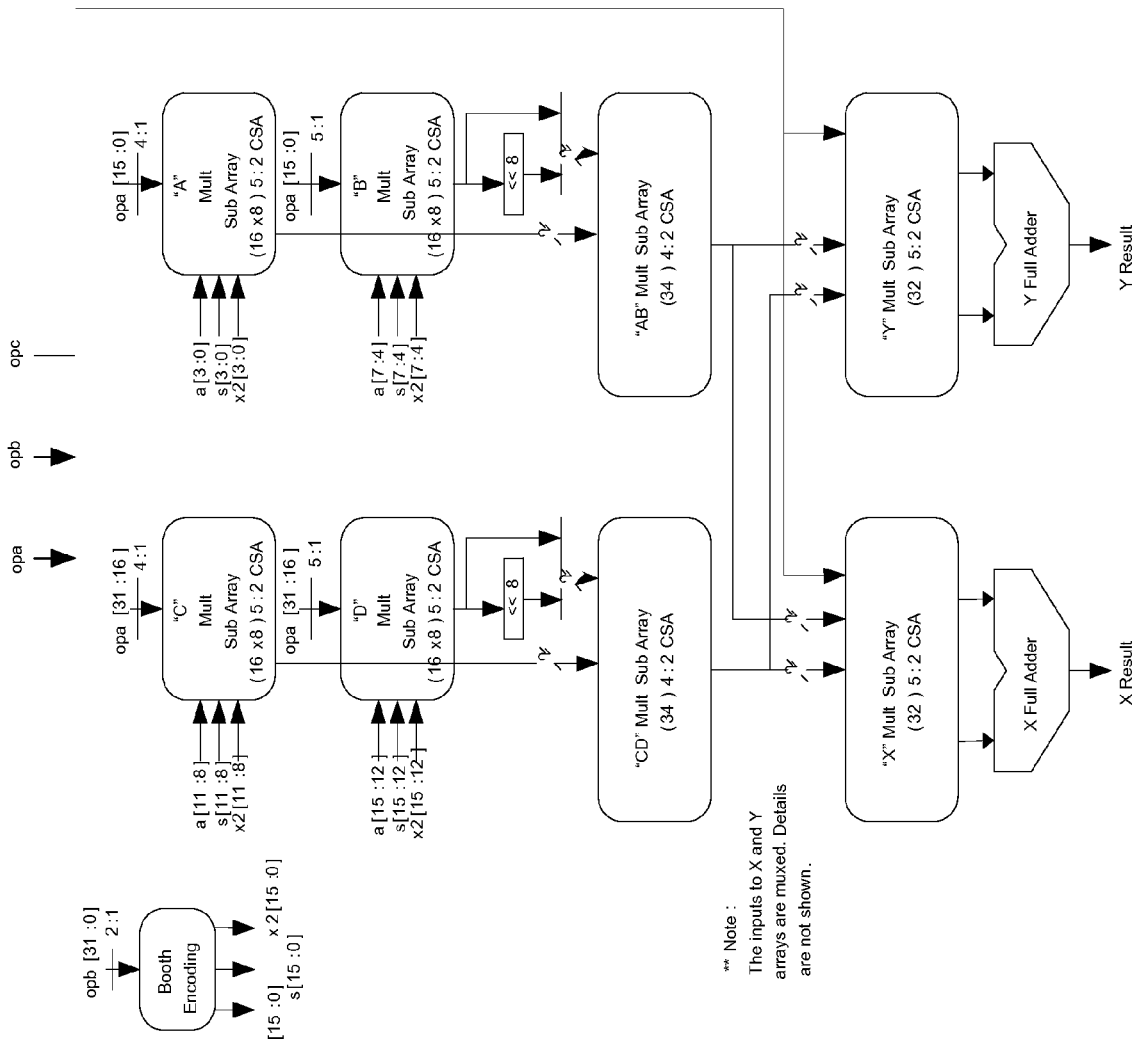
FIG. 7 illustrates a multiplier architecture that may be used to support a variety of combined-arithmetic operations including, without limitation, dot-product and add, and sum and add operations.

An efficient ALU micro-architecture is essential to support the above instruction set containing many variations of multiply, multiply add, dot product, and sum instructions mentioned above. Variations include operand size differences (8, 16, 32 bits), and operand types (signed, unsigned). In embodiments of the invention, to support this rich ISA, a unique partitioning of Wallace trees is provided, including four levels of ALU components, as shown in FIG. 7. A first level of ALU components includes four instances (A, B, C, D) of 16×8 Booth encoded multipliers constructed of 5:2 Wallace CSA (carry/sum adder) arrays.

The second level of ALU components includes two instances (AB, CD) of 4:2 Wallace CSA arrays. The first array (AB) adds together the results of A and B. The second array (CD) adds together the results of C and D. At the input of the arrays is a multiplexer allowing one of the results to be shifted left by one byte. This allows the array to add data with equal bit weights (for dot products), or perform partial product accumulation for larger multiplies.

The third level of ALU components includes two separate 5:2 Wallace array instances (X, Y). These can combine different combinations of the AB and CD results along with a third operand, and create carry/sum results ready for a full propagate adder.

The fourth level of ALU components includes two full propagate adders, one to combine X's carry/sum results, and one to add Y's carry/sum results. This adder can also be used for add instructions.

Repeating the pseudo code examples of combined-function operations provided above, and lining up references input operands A, B and C (and outputs X and Y) to the operand inputs (and operation results) shown in FIG. 7, it can be seen that the foregoing pseudocode examples, and ALU microarchitecture of FIG. 7 carries out the following sub-operations in support of a given combined-function operation (note that A', B', C', D', AB' and CD' reflect the outputs of like-designated Wallace CSA's in carry/sum format):

2-element Dot-product and Add:
Y:X=sign_ext(A[1]*B[1]+A[0]*B[0]) + C
    A'    = sign_ext(opa[15:0]    * opb[7:0])
    B'    = sign_ext(opa[15:0]    * opb[15:8])
    C'    = sign_ext(opa[31:16]    * opb[23:16])
    D'    = sign_ext(opa[31:16]    * opb[31:24])
    AB'    = sign_ext(A' + (B'<<8))
    CD'    = sign_ext(C' + (D'<<8))
    X    = AB'[31:0] + CD'[31:0]) + opc[31:0]
    Y    = sign_ext(AB'[63:32] + CD'[63:32] + X'carry_out)

2-element Dot-product with Negate and Add:
Y:X=sign_ext(A[1]*B[1]−A[0]*B[0]) + C
    A'    = sign_ext(opa[15:0]    * opb[7:0])
    B'    = sign_ext(opa[15:0]    * opb[15:8])
    C'    = sign_ext(opa[31:16]    * opb[23:16])
    D'    = sign_ext(opa[31:16]    * opb[31:24])
    AB'    = sign_ext(A' + (B'<<8))
    CD'    = sign_ext(C' + (D'<<8))
    X    = ~(AB'[31:0]) + 1 + CD'[31:0]) + opc[31:0]
    Y    = sign_ext(~(AB'[63:32]) + CD'[63:32] + X'carry_out)

4-element Dot-product and Add:
X=sign_ext(A[3]*B[3]+A[2]*B[2]+A[1]*B[1]+A[0]*B[0]) + C
    A'    = sign_ext(opa[7:0]    * opb[7:0])
    B'    = sign_ext(opa[15:8]    * opb[15:8])
    C'    = sign_ext(opa[23:16]    * opb[23:16])
    D'    = sign_ext(opa[31:24]    * opb[31:24])
    AB'    = sign_ext(A' + B')
    CD'    = sign_ext(C' + D')
    X    = sign_ext(AB'[31:0] + CD'[31:0])) + opc[31:0]

4-way Multiply and Add (same output precision)
X[3] = sat(A[3] * B[3] + C[3])
X[2] = sat(A[2] * B[2] + C[2])
X[1] = sat(A[1] * B[1] + C[1])
X[0] = sat(A[0] * B[0] + C[0])
    A'    = sign_ext(opa[7:0]    * opb[7:0])
    B'    = sign_ext(opa[15:8]    * opb[15:8])
    C'    = sign_ext(opa[23:16]    * opb[23:16])
    D'    = sign_ext(opa[31:24]    * opb[31:24])
    AB'    = bypass
    CD'    = bypass
    X[0]    = sat(A' + opc[7:0])
    (note: block carries at byte boundary)
    X[1]    = sat(B' + opc[15:8])
    X[2]    = sat(C' + opc[23:16])
    X[3]    = sat(D' + opc[31:24])

2-way Multiply and Add (same output precision)
X[1] = sat(A[1] * B[1] + C[1])
X[0] = sat(A[0] * B[0] + C[0])
    A'    = sign_ext(opa[15:0]    * opb[7:0])
    B'    = sign_ext(opa[15:0]    * opb[15:8])
    C'    = sign_ext(opa[31:16]    * opb[23:16])
    D'    = sign_ext(opa[31:16]    * opb[31:24])
    AB'    = sign_ext(A' + (B'<<8))
    CD'    = sign_ext(C' + (D'<<8))
    X[0]    = sat(AB'[31:0] + opc[15:0])
    (note: block carries at 16b boundary)
    X[1]    = sat(CD'[31:0] + opc[31:0])

4-way Multiply and Add (double precision output)
Y[1] = sign_ext(A[3] * B[3] + C[3])
Y[0] = sign_ext(A[2] * B[2] + C[2])
X[1] = sign_ext(A[1] * B[1] + C[1])
X[0] = sign_ext(A[0] * B[0] + C[0])
    A'    = sign_ext(opa[7:0]    * opb[7:0])
    B'    = sign_ext(opa[15:8]    * opb[15:8])
    C'    = sign_ext(opa[23:16]    * opb[23:16])
    D'    = sign_ext(opa[31:24]    * opb[31:24])
    AB'    = bypass
    CD'    = bypass
    X[0]    = sign_ext(A' + opc[7:0])
    (note: block carries at 16b boundary)
    X[1]    = sign_ext(B' + opc[15:8])
    Y[0]    = sign_ext(C' + opc[23:16])
    Y[2]    = sign_ext(D' + opc[31:24])

2-way Multiply and Add (double precision output)
Y = sign_ext(A[1] * B[1] + C[1])
X = sign_ext(A[0] * B[0] + C[0])
    A'    = sign_ext(opa[15:0]    * opb[7:0])
    B'    = sign_ext(opa[15:0]    * opb[15:8])
    C'    = sign_ext(opa[31:16]    * opb[23:16])
    D'    = sign_ext(opa[31:16]    * opb[31:24])
    AB'    = sign_ext(A' + (B'<<8))

-continued

```
    CD'     = sign_ext(C' + (D'<<8))
    X       = sign_ext(AB'[31:0] + opc[15:0])
    Y       = sign_ext(CD'[31:0] + opc[31:0])
4-element Sum and Add:
X=sign_ext(A[1] + A[0] + B[1] + B[0] + C)
    A'      = sign_ext(opa[15:0]    * 1)
    B'      = sign_ext(opa[31:16]   * 1)
    C'      = sign_ext(opb[15:0     * 1)
    D'      = sign_ext(opb[31:16]   * 1)
    AB'     = bypass
    CD'     = bypass
    X       = sign_ext(A' + B' + C' + D' + opc[31:0])
2-way 4-element Sum and Add (8b A, 8b B, 16b C):
X[1]=sign_ext(A[3] + A[2] + B[3] + B[2] + C[1])
X[0]=sign_ext(A[1] + A[0] + B[1] + B[0] + C[0])
    A'      = sign_ext(opa[15:0]    * 1)
    B'      = sign_ext(opa[31:16]   * 1)
    C'      = sign_ext(opb[15:0     * 1)
    D'      = sign_ext(opb[31:16]   * 1)
    AB'     = sign_ext(A' + B') (note: block carries at 16b
    boundary)
    CD'     = sign_ext(C' + D')
    X[1]    = sign_ext(AB'[1] + CD'[1] +
    opc[31:16]) (note: block carries at 16b boundary)
    X[0]    = sign_ext(AB'[0] + CD'[0] + opc[15:0])
```

Within the foregoing sub-operations, the function "sign_ext( )" effects a sign extension from m-bits to n-bits (16 bits to 32 bits in this example). The function, "sat( )" returns a minimum or maximum m-bit 2's complement number if the function argument (i.e., the input to the function) exceeds the minimum or maximum of the m-bit 2's complement number, and otherwise returns the least significant m bits of the function argument. Also, the terms, 'x2', 's', and 'a' are Booth encoded control signals. Using radix-4 Booth encoding, for example, allows the number of partial product terms summed in the Wallace tree to be reduced by roughly half. Three consecutive bits of the multiplier are encoded to produce an x2,a,s control value that is used, in turn, to choose a single partial product term. The next 3 bit window of multiplier bits overlaps the first window by one bit. The encoding is as follows:

```
// {booth_a,booth_s} = = 00: Invalid
// {booth_a,booth_s} = = 01: don't invert partial product
// {booth_a,booth_s} = = 10: invert partial product
// {booth_a,booth_s} = = 11: 0 for partial product
// booth_x2 = = 1            :partial product = 2*multiplicand
// booth_x2 = = 0            :partial product = multiplicand
```

Stream Load/Store Unit

Figure 8:
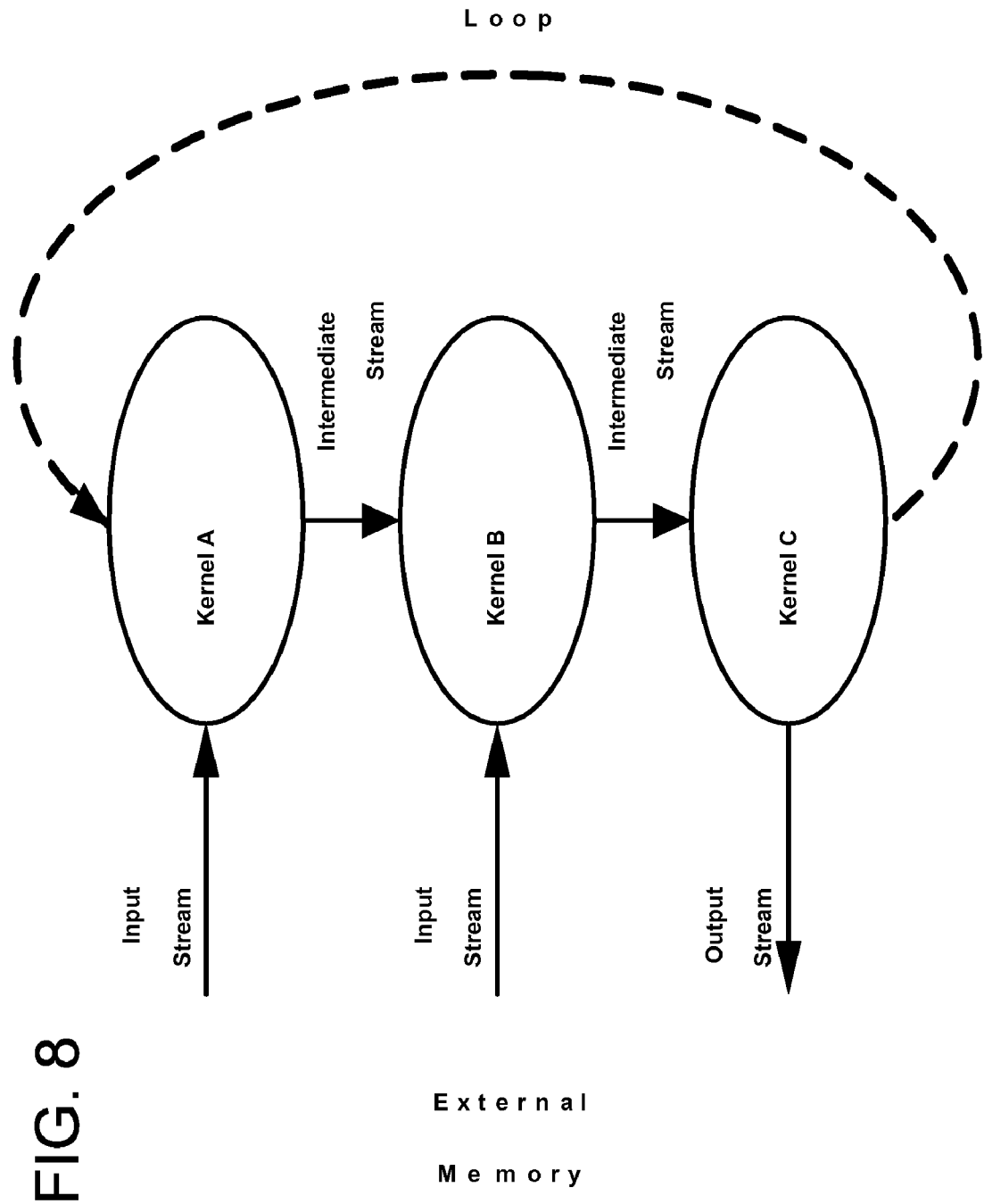
FIG. 8 illustrates data flow of strips of data during kernel execution within the stream processor of FIG. 2.

One programming model for a system that includes the stream processor of FIG. 2 consists of a main instruction stream running on a host CPU and separate computation kernels that run on the stream processor. The host CPU dispatches stream commands for respective strips of data and loops over the data strips in order to sustain real-time operation. This dataflow is shown graphically in FIG. 8.

Figure 9B:
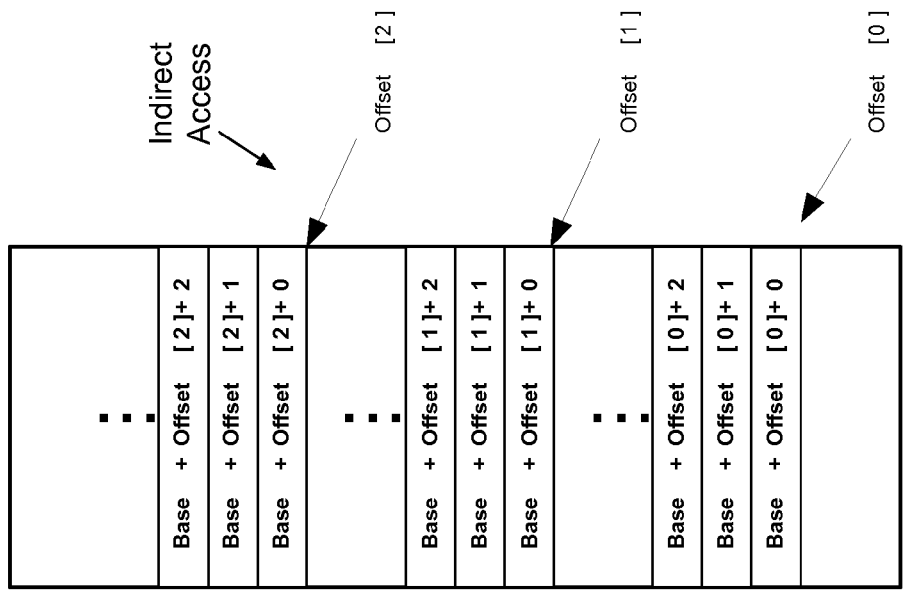
FIGS. 9A and 9B illustrate memory access patterns supported by an embodiment of the stream processor of FIG. 2.
Figure 9A:
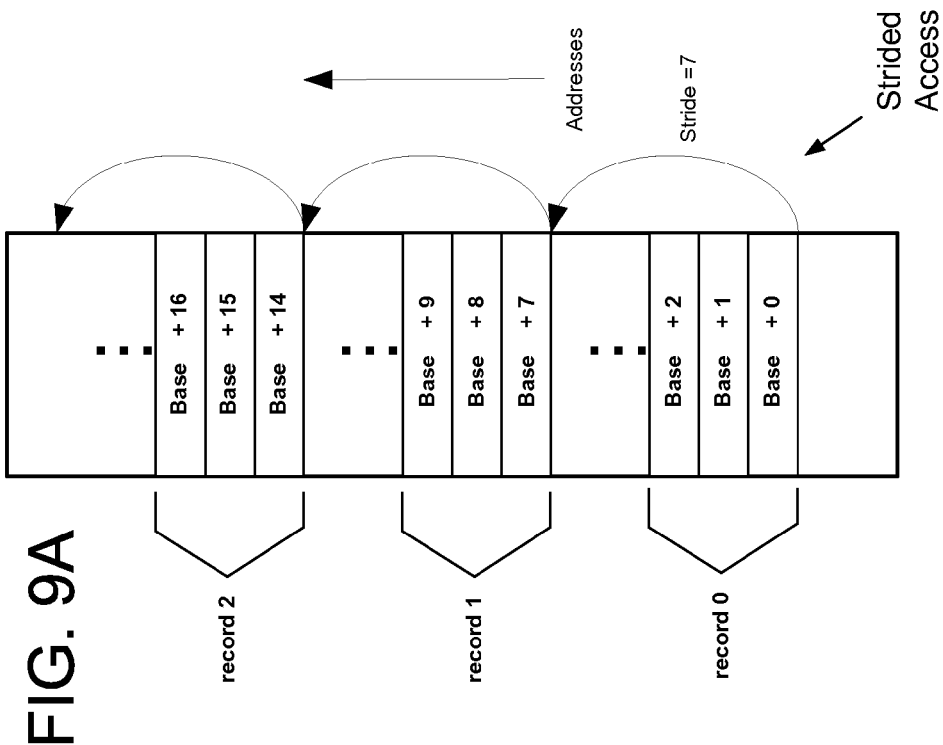
Figure 10:
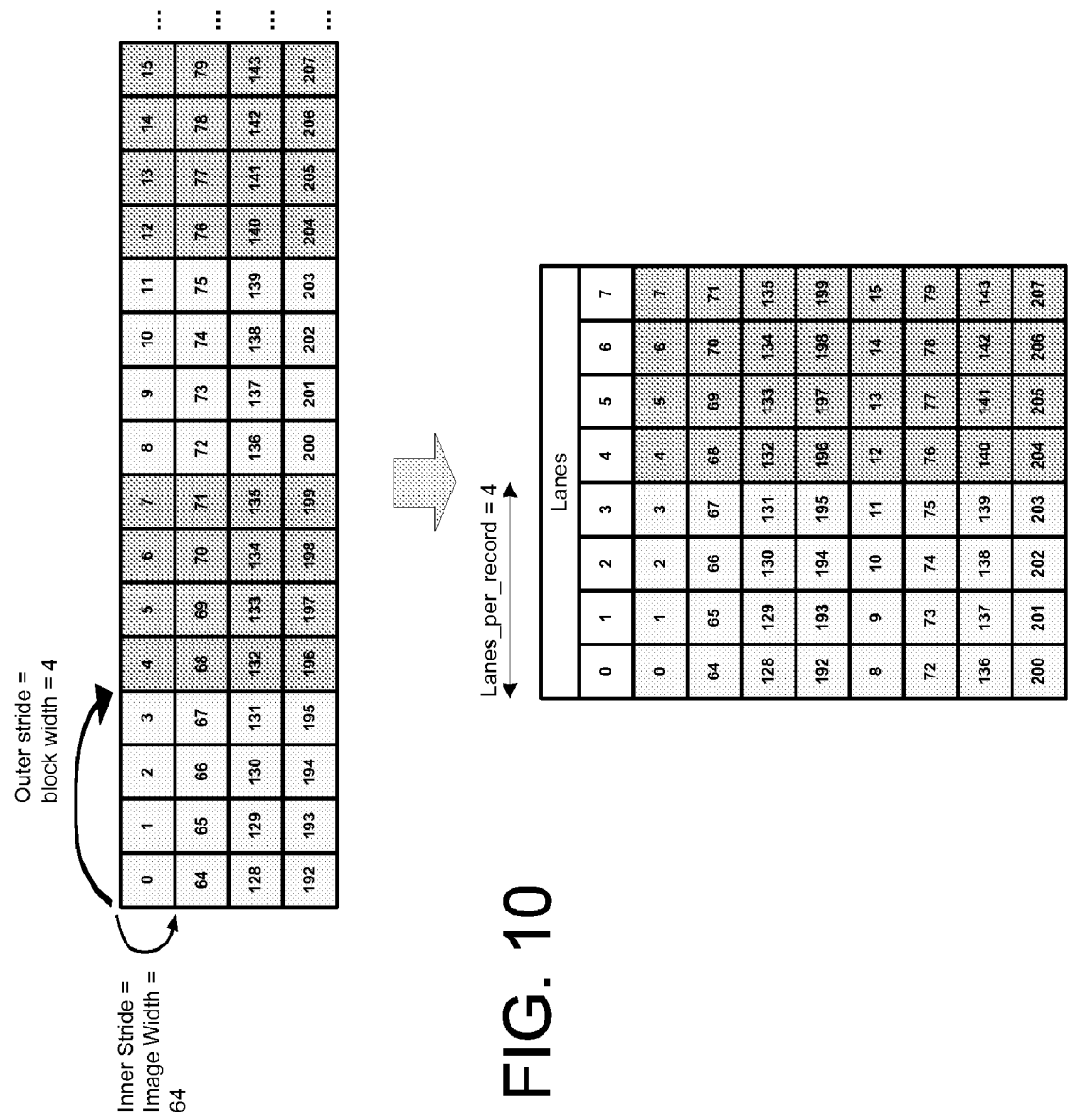
FIG. 10 illustrates another memory access pattern that may be supported by an embodiment of the stream processor of FIG. 2, in this case having 2 levels of nesting so that contiguous 2D blocks of pixels from an image stored in row-major order may be fetched.

Referring again to FIG. 2, the stream load/store unit 143 executes MEMLD (memory load) or MEMST (memory store) stream commands that transfer data between external memory and the LRFs. In many cases, stream commands process between tens and thousands of bytes of data at a time using memory access patterns provided with the command. More specifically, memory access patterns may be used to specify the address sequence for the data transferred during MEMLDs and MEMSTs. These access patterns are defined by an external memory base address, an external memory address sequence, and an LRF address sequence. Base addresses are arbitrary byte addresses in external memory. The address sequence can be specified as a stride between subsequent records all at address offsets from the base address or as a sequent of indirect record offsets from a common base address. FIG. 9A provides an example of a stride of 7 with a record size of 3, whereas FIG. 9B shows indirect offsets with a record size of 3. More complicated addressing patterns are supported with nested strided patterns or a combination of strided and indirect patterns. For example, with 2 levels of nesting, contiguous 2D blocks of pixels from an image stored in row-major order could be fetched where an inner stride would correspond to the image width while the outer stride would correspond to the block width. An example of such multiple-level nesting is shown in FIG. 10.

The external memory access patterns may be described using command arguments that specify record sizes and strides (non-nested or nested) in external memory. Once data records are fetched from external memory and arranged into a linear sequence of records belonging to the stream to be loaded, the data in the stream needs to be divided up among the lanes. A simple example with a 4-lane stream processor where each 3-word record is sent to each lane is shown in Table 1 below.

TABLE 1

Example of LRF partitioning

| Lane 0 | Lane 1 | Lane 2 | Lane 3 |
|---|---|---|---|
| Base + 0 | Base + 7 | Base + 14 | Base + 21 |
| Base + 1 | Base + 8 | Base + 15 | Base + 22 |
| Base + 2 | Base + 9 | Base + 16 | Base + 23 |
| Base + 28 | Base + 35 | Base + 42 | Base + 49 |
| Base + 29 | Base + 36 | Base + 43 | Base + 50 |
| ... | ... | ... | ... |

With a more complex example, multiple words from a single record (i.e., having record_size number of words) could be spread out over multiple lanes (i.e., lanes_per_record). FIGS. 11A and 11B illustrate retrieval of data and distribution of the retrieved data to lanes in accordance with the example of Table 1 (record_size=3, lanes_per_record=1, stride=7) and in an example having multiple words from a single record spread out over multiple lanes (e.g., record_size=4, lanes_per_record=2, stride=7), respectively.

The partitioning of records among the lanes can be described with command arguments that indicate the number of words from the sequentially assembled stream to write to each lane before filling up words in the next lane (e.g., record_size and lanes_per_record). For implementation simplicity, it is beneficial to hold the number of words per lane constant during the MEMLD or MEMST command execution.

Further complicating the loading or storing of this data from external memory, modern DRAM memory systems have long data burst requirements in order to achieve high bandwidth. DRAM bursts are multi-word reads or writes from external memory that can be as high as 8 or 16 words per access in a modern memory system. Memory addresses sent to the DRAM access these 8-word or 16-word bursts, not individual bytes or words within the burst. Consequently, in a DRAM memory system that issues bursts of 8 words (for example), reading the first 4 records (12 words) of the stream in the example above (i.e., described in reference to FIG. 9A) actually requires reading 3 DRAM bursts, as shown in FIG. 12.

The stream load/store unit is capable of taking these external memory access patterns, record partitioning across the LRFs, and converting these into sequences of burst addresses and transferring individual words from those bursts to/from the LRFs.

It should be noted that the above description of access patterns can be extended to arbitrary record lengths, strides, nested strides, and partitioning of records across LRFs. In addition, although the example above was given for a MEMLD, it also applies to MEMST Memory Subsystem Architecture The stream load/store unit subsystem handles all aspects of executing MEMLDs and MEMSTs. It assembles address sequences into bursts based on flexible memory access patterns, thereby eliminating redundant fetches of bursts from external memory. It also manages partitioning of streams across the lanes $310_0$-$310_{15}$.

Figure 13:
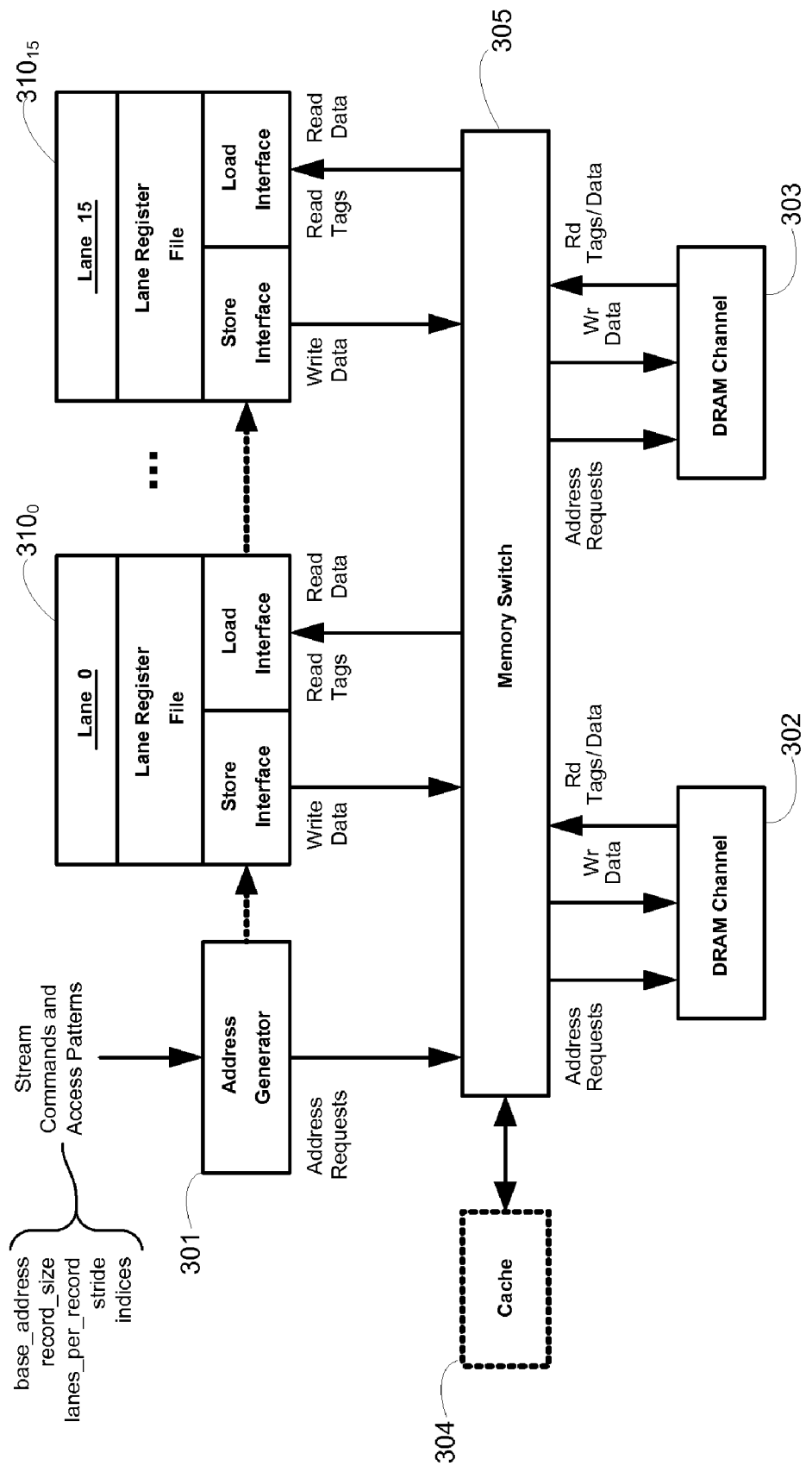
FIG. 13 shows an embodiment of a memory subsystem capable of accepting memory-load and memory-store stream commands with various strided and indirect access patterns.

FIG. 13 shows an embodiment of a memory subsystem capable of accepting MEMLD or MEMST stream commands with various strided and indirect access patterns. The memory system subdivides stream commands into external memory bursts to one or more DRAM channels 302 and 303, and writes the loaded data back into the LRFs. In the particular embodiment shown, the memory subsystem is composed of several key components:

Address generators accept stream commands and access patterns from the DPU dispatcher and compute sequences of burst address requests.

Each lane 310 contains a load and store interface for buffering data between the LRFs and the memory switch 305.

A memory switch 305 handles routing burst address requests and burst data between DRAM channels and the lanes $310_0$-$310_{15}$.

An optional cache 304 eliminates redundant read requests to the same burst in external memory.

During execution of a specific stream command, stream commands are sent from the DPU dispatcher to address generator 301. The address generator parses the stream command to figure out a burst address sequence based on the memory access pattern. As individual address requests are sent to DRAM, the load or store interface in each lane 310 analyzes the current burst address request to determine if it has any data that belongs to its LRF partition corresponding to the current burst. During stores, if a lane 310 has data corresponding to that burst, the lane 310 sends its data out with the current burst. During loads, a recording of the corresponding burst is stored locally in each lane 310 so that when the return data is sent back from DRAM, the return data gets stored into the appropriate LRF (i.e., as indicated by the record of the burst stored in each lane 310).

Still referring to FIG. 13, the memory switch 305 handles routing of address requests and data values between the address generator and LRFs with the cache 304 and external DRAM channels. In a system without a cache 304, if the address requests are restricted to native request sizes supported by each DRAM channel, it eases implementation complexity. For example, if each DRAM channel supports up to 8-word bursts, the address requests sent out by the address generators could directly correspond to 8-word bursts and memory requests could be supplied directly to the DRAM channel. This approach has the disadvantage of potentially incurring redundant accesses of data, particularly with indirect modes. With indirect modes, if multiple offsets within a stream command access the same burst, then the address generator would end up sending redundant address requests to external memory.

In a system with a cache 304, the address requests made by the address generators are not limited to native DRAM requests and redundant accesses can be supported. For example, consider a situation where each DRAM channel supports 32-byte bursts and the cache 304 contains a 32-byte line size. If one indirect-mode access requests the lower 16 bytes from that burst for a data record, then that burst will be loaded into the cache 304. If an access later in the stream accesses the upper 16 bytes to the same burst, instead of accessing external memory to re-fetch the data, the data can be read out of the cache 304. A system with a cache 304 can also support address requests from the address generator to non-burst-aligned addresses. Individual address requests to bursts of data can be converted by the cache 304 into multiple external DRAM requests.

Although the above embodiment of a stream load/store unit contains one load unit, one store unit, sixteen lanes and two DRAM channels, multiple load units, multiple store units, a different number of lanes, and more or fewer DRAM channels may be provided in alternative embodiments.

Figure 14:
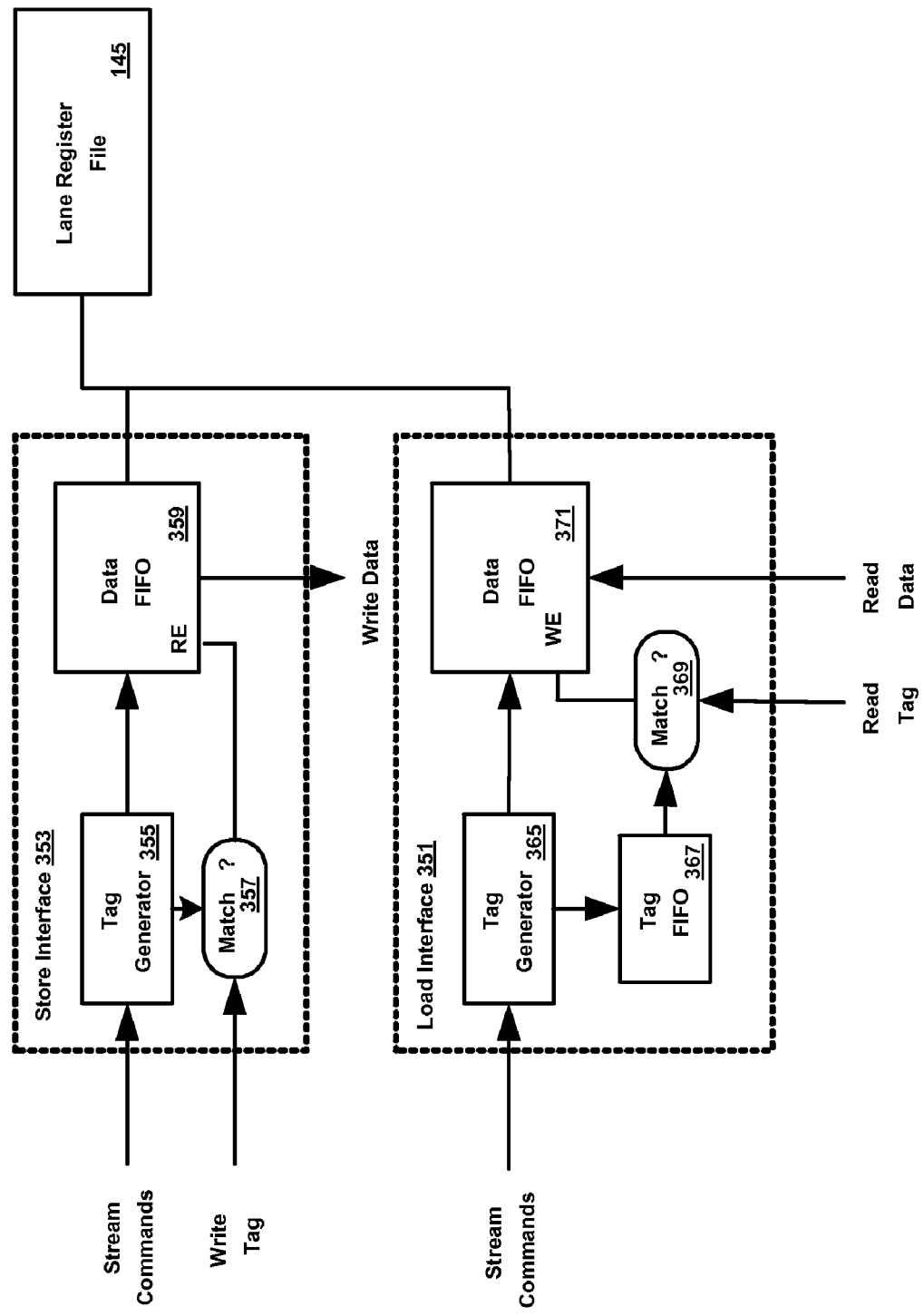
FIG. 14 illustrates an embodiment of the load interface and store interface to the LRF within a given execution lane.

FIG. 14 illustrates an embodiment of the load interface 351 and store interface 353 to the LRF 145 within a given execution lane. The store interface 353 contains a tag generator 355, a tag matching circuit 357, and a data fifo 359 (first-in-first-out storage circuit). The load interface 351 contains a tag generator 365, a tag fifo 367, a tag matching circuit 369 for return data, and a return data fifo 371.

During both loads and stores, the tag generator (355, 365) also parses the stream command to determine the word address sequence of all of the data elements in this lane during a memory load or store data transfer. Note that this is different than the address generator burst address sequence since it also indicates the location of a word within a burst. For example, in a memory system with an 8-word burst, the tag generator (355, 365) indicates that a certain data element has a burst address and is in offset 3 of 8 within that burst. Tags may be formed by a combination of a subset of the addresses and the lane number and just need to be large enough to avoid aliasing between data elements across the lanes.

During stores, as each address is computed, a word is transferred from the LRF SB into the data fifo 359. Once enough words have been transferred into the data fifo to form the first address request, the address generator will send out an address request and a corresponding write tag. The tag matching circuit 357 analyzes the write tag. If any data elements from the current burst are in this lane's data fifo 359, the match circuit 357 will indicate that, and write data will be driven onto the bus to correspond to this address request.

During loads, as each address is computed, an entry in the tag fifo 367 indicating that this lane register file needs a word from a specific burst is updated. Once read requests return from either the cache or external DRAM, a read tag corresponding to the request is compared against the next tag in the tag fifo 367. If any of the elements from the current burst correspond to words that belong in this lane's LRF, then those data elements are written into the data fifo 371. Once enough data elements have been accumulated in the data fifos 371 across all of the lanes, then words can be transferred into the LRFs through the SBs.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

The section headings in the preceding detailed description are provided for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A method of operation within an integrated-circuit processing device having a plurality of execution lanes, the method comprising:
   receiving an instruction to exchange data between the plurality of execution lanes;
   examining, in response to the instruction, respective requests from the plurality of execution lanes to determine a set of the execution lanes that is to send data to one or more others of the execution lanes during a first interval;
   signaling each execution lane within the set of the execution lanes to indicate that each execution lane is to send data to the one or more others of the execution lanes;
   determining, based on the set of the execution lanes, each of the one or more others of the execution lanes to which data is to be sent during the first interval;
   outputting, to each of the one or more others of the execution lanes to which data is to be sent during the first interval, a source lane identifier that identifies which execution lane within the set of the execution lanes from which to receive data during the first interval; and
   selecting, for each of the one or more others of the execution lanes to which data is to be sent during the first interval via an associated multiplexing circuit, a signal path coupled to the execution lane identified by the source lane identifier, wherein the associated multiplexing circuit comprises a plurality of multiplexers each having an output coupled to a respective one of the plurality of execution lanes, and inputs coupled to others of the plurality of execution lanes, and wherein each of the one or more others of the execution lanes to which data is to be sent during the first interval outputs a value that corresponds to the source lane identifier to a control input of a respective one of the plurality of multiplexers to switchably couple, to the output of the multiplexer, the signal path coupled to the execution lane identified by the source lane identifier.

2. The method of claim 1 wherein receiving an instruction to exchange data between the plurality of execution lanes comprises retrieving the instruction from a memory external to the integrated-circuit processing device and loading the instruction into an instruction memory of the integrated-circuit processing device.

3. The method of claim 1 wherein examining respective requests from the plurality of execution lanes comprises receiving, from each of the execution lanes in the plurality of execution lanes, a request that includes a destination identifier and a valid indicator, the valid indicator indicating whether the request is valid and the destination identifier indicating one of the execution lanes in the plurality of execution lanes.

4. The method of claim 3 wherein examining respective requests from the plurality of execution lanes to determine a set of the execution lanes that is to send data to the one or more others of the execution lanes during a first interval comprises selecting, for inclusion within the set of the execution lanes that is to send data, each execution lane from which a request was received and for which (i) the valid indicator indicates a valid request, and (ii) the destination identifier does not match a destination identifier associated with a request from another one of the execution lanes for which the valid indicator also indicates a valid request.

5. The method of claim 4 wherein examining respective requests from the plurality of execution lanes to determine a set of the execution lanes that is to send data to the one or more others of the execution lanes during a first interval further comprises:
   arbitrating between two or more requests, indicated to be valid and having matching destination identifiers, including identifying one of the two or more requests as an arbitration winner and the remainder of the two or more requests as arbitration losers; and
   selecting, for inclusion within the set of the execution lanes that is to send data, the execution lane corresponding to the one of the two or more requests identified as the arbitration winner.

6. The method of claim 4 wherein selecting an execution lane for inclusion within the set of the execution lanes that is to send data comprises outputting a success signal to the selected execution lane.

7. An integrated-circuit processing device comprising:
   a plurality of execution lanes to execute instructions in parallel;
   an interlane switch coupled to the plurality of execution lanes to enable data to be exchanged between execution lanes in the plurality of execution lanes;
   an instruction sequencing circuit to receive an instruction to enable data exchange between the execution lanes in the plurality of execution lanes; and
   a control circuit to examine, in response to the instruction, respective requests from the plurality of execution lanes to determine a set of the execution lanes that is to send data to one or more others of the execution lanes during a first interval, the control circuit to signal each execution lane within the set of the execution lanes to indicate that the execution lane is to send data to the one or more others of the execution lanes;

wherein the control circuit determines, based on the set of the execution lanes, each of the one or more others of the execution lanes to which data is to be sent during the first interval, and wherein the control circuit outputs, to each of the execution lanes to which data is to be sent during the first interval, a source lane identifier that identifies which execution lane within the set of the execution lanes from which to receive data during the first interval; and wherein the interlane switch comprises a plurality of multiplexers each having an output coupled to a respective one of the plurality of execution lanes, and inputs coupled to others of the plurality of execution lanes, and wherein, each of the one or more others of the execution lanes to which data is to be sent during the first interval, outputs a value that corresponds to the source lane identifier to a control input of a respective one of the plurality of multiplexers to switchably couple, to the output of the multiplexer, a signal path coupled to the execution lane identified by the source lane identifier.

8. The processing device of claim 7 further comprising:
an instruction memory; and
an instruction fetch unit to fetch the instruction from a memory external to the integrated-circuit processing device and to load the instruction into the instruction memory.

9. The processing device of claim 7 wherein the control circuit includes inputs to receive, from each of the execution lanes in the plurality of execution lanes, a request that includes a destination identifier and a valid indicator, the valid indicator indicating whether the request is valid and the destination identifier indicating one of the execution lanes in the plurality of execution lanes.

10. The processing device of claim 9 wherein the control circuit determines the set of the execution lanes that is to send data to the one or more others of the execution lanes, at least in part, by selecting, within the set of the execution lanes that is to send data, each execution lane from which a request was received and for which (i) the valid indicator indicates a valid request, and (ii) the destination identifier does not match a destination identifier associated with a request from another one of the execution lanes for which the valid indicator also indicates a valid request.

11. The processing device of claim 10 wherein the control circuit further determines the set of the execution lanes that is to send data to the one or more others of the execution lanes, at least in part, by arbitrating between two or more requests, indicated to be valid and having matching destination identifiers, including identifying one of the two or more requests as an arbitration winner and the remainder of the two or more requests as arbitration losers, the control circuit selecting, for inclusion within the set of the execution lanes that is to send data, the execution lane corresponding to the one of the two or more requests identified as the arbitration winner.

12. The processing device of claim 10 wherein the control circuit selects an execution lane for inclusion within the set of the execution lanes that is to send data by outputting a success signal to the selected execution lane.

13. A non-transitory computer-readable media storing instructions that, when executed by computer, generate mask information of an integrated circuit (IC) package comprising:
a plurality of execution lanes to execute instructions in parallel;
an interlane switch coupled to the plurality of execution lanes to enable data to be exchanged between respective pairs of the execution lanes;
an instruction sequencing circuit to receive an instruction to enable exchange of data between the execution lanes; and
a control circuit to examine, in response to the instruction, respective requests from the plurality of execution lanes to determine a set of the execution lanes that is to send data to the one or more others of the execution lanes during a first interval, the control circuit to signal each execution lane within the set of the execution lanes to indicate that the execution lane is to send data to the one or more others of the execution lanes;
wherein the control circuit determines, based on the set of the execution lanes, each of the one or more others of the execution lanes to which data is to be sent during the first interval, and wherein the control circuit outputs, to each of the one or more others of the execution lanes to which data is to be sent during the first interval, a source lane identifier that identifies which execution lane within the set of the execution lanes from which to receive data during the first interval; and
wherein the interlane switch comprises a plurality of multiplexers each having an output coupled to a respective one of the plurality of execution lanes, and inputs coupled to others of the plurality of execution lanes, and wherein, each of the one or more others of the execution lanes to which data is to be sent during the first interval, outputs a value that corresponds to the source lane identifier to a control input of a respective one of the plurality of multiplexers to switchably couple, to the output of the multiplexer, a signal path coupled to the execution lane identified by the source lane identifier.

14. The non-transitory computer-readable media of claim 13 wherein the control circuit includes inputs to receive, from each of the execution lanes in the plurality of execution lanes, a request that includes a destination identifier and a valid indicator, the valid indicator indicating whether the request is valid and the destination identifier indicating one of the execution lanes in the plurality of execution lanes.

* * * * *

UNITED STATES PATENT AND TRADEMARK OFFICE
CERTIFICATE OF CORRECTION

| | | |
|---|---|---|
| PATENT NO. | : 8,024,553 B2 | Page 1 of 1 |
| APPLICATION NO. | : 12/192813 | |
| DATED | : September 20, 2011 | |
| INVENTOR(S) | : Khailany et al. | |

It is certified that error appears in the above-identified patent and that said Letters Patent is hereby corrected as shown below:

Column 16, line 11, in Claim 13, delete "integrated circuit" and insert -- integrated-circuit --.

Signed and Sealed this
Sixth Day of March, 2012

David J. Kappos
*Director of the United States Patent and Trademark Office*